United States Patent Office 2,793,206
Patented May 21, 1957

2,793,206

AZO DYESTUFFS

Mario Scalera and Julian Jacob Leavitt, Somerville, N. J., assignors to American Cyanamid Company, New York, N. Y., a corporation of Maine No Drawing. Application July 7, 1953,
Serial No. 366,636

1 Claim. (Cl. 260—203)

This invention relates to new azo dyes and more particularly to a novel azo dyestuff of the formula:

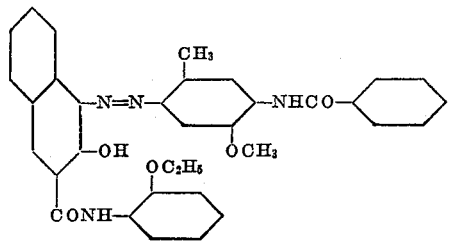

which may be used to dye cotton a plum shade of good light fastness.

There has been a need in the art for many years for an azoic dye which would give the very desirable plum shade of Bordeaux; however, there has been no single product on the market to fill this need. The desired color has been approximated by reddening a violet dye by the direct admixture of a red dye. One such mixture which has been used consists of a mixture of a stabilized diazo from 4-amino-6-methyl-m-benzanisidide and 3-hydroxy-2-naphthanilide (Prototype 351) and a stabilized diazo from 4-chloro-2-anisidine and the ortho-anisidide of 2-naphthol-3-3-carboxylic acid (Prototype 169) in a ratio of 4:1. Although these mixed dyes have been employed in the dyeing industry they are generally much less satisfactory than single dyes. It is obvious that the two or more components of a mixed dye are likely to have different properties, especially with respect to fastness and stability. Therefore, it is not surprising that fabrics dyed with these compositions are unsatisfactory as the effects of age and exposure to sunlight, atmosphere and laundering are not uniform on the various dyes in the mixture, thus causing the fabric to fade unevenly or to change shade in some cases instead of fading "on-tone."

A dyestuff prepared by coupling 2'-ethoxy-2-hydroxy-3-naphthanilide with 4'-amino-6'-methyl-m-benzanisidide has been proposed as a single dye to supply the desired plum shade of Bordeaux. This dye is not as good as the previously known mixed dyes; however, because it has poor fastness properties and does not give a particularly desirable shade. The surprising discovery has now been made that an isomer of the compound named above produced by coupling 4'-amino-5'-methyl-o-benzanisidide with 2'-ethoxy-2-hydroxy-3-naphthanilide gives a very desirable plum shade of Bordeaux and in addition has very good light fastness which makes its use highly practicable. It is not known why the novel isomer is such a vast improvement over the prior art compound which is isomeric with it. The discovery of the new compound is a distinct and valuable advance in the art both to the manufacturer and the colorist because of the improved color and fastness of the dye itself.

The novel compound of this invention can be applied by the usual dyeing procedures which are well known in the art, no special method of application being required. For example, cloth padded with an appropriate coupling component can be passed through a solution of diazotized 4'-amino-5'-methyl-o-benzanisidide in the conventional manner. Alternatively, the diazonium compound can be converted to a diazoamino compound by reaction with an appropriate amine such as sarcosine or methyl taurine and the stabilized diazo produced incorporated in conventional naphthol containing printing formulations. Prints made with such a formulation may be deveoped on the cloth by the well known method of acid aging in an atmosphere of steam and acetic acid fumes. Attractive shades of good fastness properties are obtained with many common coupling agents but the most desirable results are obtained when 2'-ethoxy-2-hydroxy-3-naphthanilide is used.

The invention is illustrated by the following examples in which all parts are by weight unless othewise specified.

Example 1

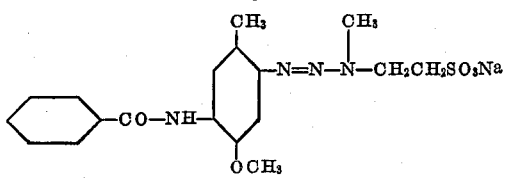

A mixture of 51.2 parts of 4'-amino-5'-methyl-o-benzanisidide, 800 parts of water and 52.2 parts of 20° Bé. hydrochloric acid is diazotized by the addition of 200 parts of 7% sodium nitrite solution. The resultant solution is clarified by filtration, using 5 parts of siliceous filter aid, and added to a solution of 29.2 parts of N-methyltaurine and 85.4 parts of soda ash in 450 parts of water, holding the temperature at 10 to 11° C. by external cooling. A cream-colored precipitate separates from the solution. After the addition of 85 parts of sodium chloride, the slurry is stirred to complete the separation of the product. The latter is isolated by filtration, washed with alkaline brine, and dried, giving an excellent yield of light brown solid.

Example 2

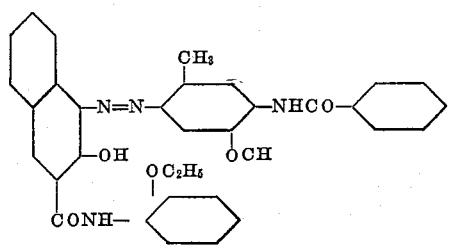

A powder blend is prepared by intimately mixing 16.15 parts of 2'-ethoxy-2-hydroxy-3-naphthanilide, 1.00 parts of sodium aluminate, 21.4 parts of the product of Example 1 and sufficient inert diluent, such as dextrin, to make a total of 50.0 parts by weight. Three parts of the resultant blend is dissolved in a mixture of 3 parts of ethylene glycol monoethyl ether, 1.5 parts of 30° Bé. caustic, and 22.5 parts of water. The solution is stirred into 70 parts of 12.5% aqueous carbohydrate gum, and the resultant paste is printed on cotton. The cloth is dried, steamed at 100° C. in an atmosphere containing acetic acid, soaped and dried. The fastness properties of the resultant plum shade prints are superior to those of a mixture of dyes which is an approximate match for shade, e. g., 80% of a Calconyl Violet B (Prototype 351) and 20% Calconyl Red R (Prototype 169), as well as to the isomeric dyestuff formed by coupling 4'-amino-6'-methyl-m-benzanisidide with 2'-ethoxy-2-hydroxy-3-naphthanilide.

Example 3

A hot solution of 5.0 parts of 4'-amino-5'-methyl-o-benzanisidide in 150 parts of water and 15 parts of 7% hydrochloric acid is cooled to 15° C., iced and diazotized by the addition of 15 parts of 7% hydrochloric acid and 20 parts of 7% aqueous sodium nitrite solution. The mixture is stirred to complete the reaction, diluted to 450 to 475 parts with water, clarified with the aid of 1 part of siliceous filter aid and diluted to 500 parts with water. The solution is neutralized by the addition of a few parts of 25% aqueous sodium acetate solution. A piece of 80 x 80 cotton cloth previously printed with a 1% paste of 2'-ethoxy-2-hydroxy-3-naphthanilide and dried is passed through the diazo solution, washed in cold water, soaped in a hot aqueous solution of soap and soda ash, washed again and dried. The same attractive, fast plum shade of Bordeaux is obtained as in Example 2.

We claim:
The dyestuff of the formula:

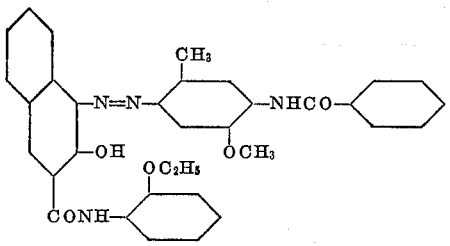

References Cited in the file of this patent
UNITED STATES PATENTS

| | | |
|---|---|---|
| 1,549,822 | Wagner | Aug. 18, 1925 |
| 1,906,226 | Glietenberg et al. | May 2, 1933 |

FOREIGN PATENTS

| | | |
|---|---|---|
| 801,582 | France | May 23, 1936 |